United States Patent
Bian et al.

(10) Patent No.: US 8,721,903 B2
(45) Date of Patent: May 13, 2014

(54) METHOD FOR PLANARIZING A PERPENDICULAR MAGNETIC RECORDING DISK FOR THERMALLY-ASSISTED RECORDING (TAR)

(75) Inventors: Xiaoping Bian, Saratoga, CA (US); Qing Dai, San Jose, CA (US); Oleksandr Mosendz, San Jose, CA (US); Franck Dreyfus Rose, San Jose, CA (US); Run-Han Wang, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 78 days.

(21) Appl. No.: 13/439,929

(22) Filed: Apr. 5, 2012

(65) Prior Publication Data
US 2013/0264306 A1    Oct. 10, 2013

(51) Int. Cl.
*B44C 1/22*    (2006.01)
(52) U.S. Cl.
USPC .................. 216/22; 216/75; 216/81; 438/720
(58) Field of Classification Search
USPC ........ 216/22, 23, 67, 68, 75, 77, 81; 438/710, 438/720, 725, 735
See application file for complete search history.

(56) References Cited

U.S. PATENT DOCUMENTS

| | | | |
|---|---|---|---|
| 6,046,758 A * | 4/2000 | Brown et al. | 347/203 |
| 6,703,099 B2 | 3/2004 | Belser | |
| 6,821,627 B2 | 11/2004 | Stirniman et al. | |
| 8,021,771 B2 | 9/2011 | Weller et al. | |
| 2007/0070547 A1 * | 3/2007 | Kamata et al. | 360/135 |
| 2007/0087227 A1 | 4/2007 | Ma et al. | |
| 2007/0133133 A1 * | 6/2007 | Freitag et al. | 360/324.12 |
| 2010/0092802 A1 | 4/2010 | Ma et al. | |
| 2011/0287618 A1 * | 11/2011 | Suzuki | 438/542 |
| 2012/0063034 A1 * | 3/2012 | Hsu et al. | 360/319 |

OTHER PUBLICATIONS

Xu et al., "Thermal Effects in Heat Assisted Bit Patterned Media Recording", IEEE Transactions on Magnetics, vol. 45, No. 5, May 2009, pp. 2292-2295.

Piramanayagam et al., "Planarization of Patterned Recording Media", IEEE Transactions on Magnetics, vol. 46, No. 3, Mar. 2010, pp. 758-763.

* cited by examiner

*Primary Examiner* — Lan Vinh
(74) *Attorney, Agent, or Firm* — Thomas R. Berthold

(57) ABSTRACT

A vacuum planarization method substantially improves the surface roughness of a thermally-assisted recording (TAR) disk that has a recording layer (RL) formed of a substantially chemically-ordered FePt alloy or FePt-X alloy (or CoPt alloy or CoPt-X alloy) and a segregant, like $SiO_2$. A first amorphous carbon overcoat (OC1) is deposited on the RL and etched with a non-chemically reactive plasma to remove at least one-half the thickness of OC1. Then a second amorphous carbon overcoat (OC2) is deposited on the etched OC1. The OC2 is then reactive-ion-etched, for example in a $H_2/Ar$ plasma, to remove at least one-half the thickness of OC2. A thin third overcoat (OC3) may be deposited on the etched OC2.

19 Claims, 5 Drawing Sheets

METHOD FOR PLANARIZING A PERPENDICULAR MAGNETIC RECORDING DISK FOR THERMALLY-ASSISTED RECORDING (TAR)

BACKGROUND OF THE INVENTION

1. Field of the Invention

This invention relates generally to perpendicular magnetic recording media for use as thermally-assisted recording (TAR) media, and more particularly to a method for planarizing a TAR disk.

2. Description of the Related Art

In conventional continuous magnetic recording media, the magnetic recording layer is a continuous layer over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is thermally-assisted recording (TAR), also called heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive read head.

One type of proposed TAR disk drive uses a "small-area" heater to direct heat just the area of the data track where data is to be written by the write head. The most common type of small-area TAR disk drive uses a laser source and an optical waveguide with a near-field transducer (NFT). A "near-field" transducer refers to "near-field optics", wherein the passage of light is through an element with subwavelength features and the light is coupled to a second element, such as a substrate like a magnetic recording medium, located a subwavelength distance from the first element. The NFT is typically located at the air-bearing surface (ABS) of the air-bearing slider that also supports the read/write head and rides or "flies" above the disk surface.

One type of proposed high-$K_u$ TAR media with perpendicular magnetic anisotropy is an alloy of FePt or CoPt alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt and CoPt alloys require deposition at high temperature or subsequent high-temperature annealing to achieve the desired chemical ordering to the $L1_0$ phase. However, the high temperature results in surface roughness which adversely affects the flyability of the slider and thus not only the ability of the NFT to heat the media, but also the ability to write and read data.

What is needed is a method for planarizing a TAR disk so that flyability of the slider is not adversely affected.

SUMMARY OF THE INVENTION

The invention relates to a vacuum planarization method for improving the surface roughness of a TAR disk that has a recording layer (RL) formed of a substantially chemically-ordered FePt alloy or FePt-X alloy (or CoPt alloy or CoPt-X alloy) and a segregant, like $SiO_2$. A first amorphous carbon overcoat (OC1) is deposited on the RL and etched with a non-chemically reactive plasma to remove at least one-half the thickness of OC1. Then a second amorphous carbon overcoat (OC2) is deposited on the etched OC1. The OC2 is then reactive-ion-etched, for example in a $H_2/Ar$ plasma, to remove at least one-half the thickness of OC2. A thin third overcoat (OC3) may be deposited on the etched OC2.

For a fuller understanding of the nature and advantages of the present invention, reference should be made to the following detailed description taken together with the accompanying figures.

DETAILED DESCRIPTION OF THE INVENTION

Figure 1:
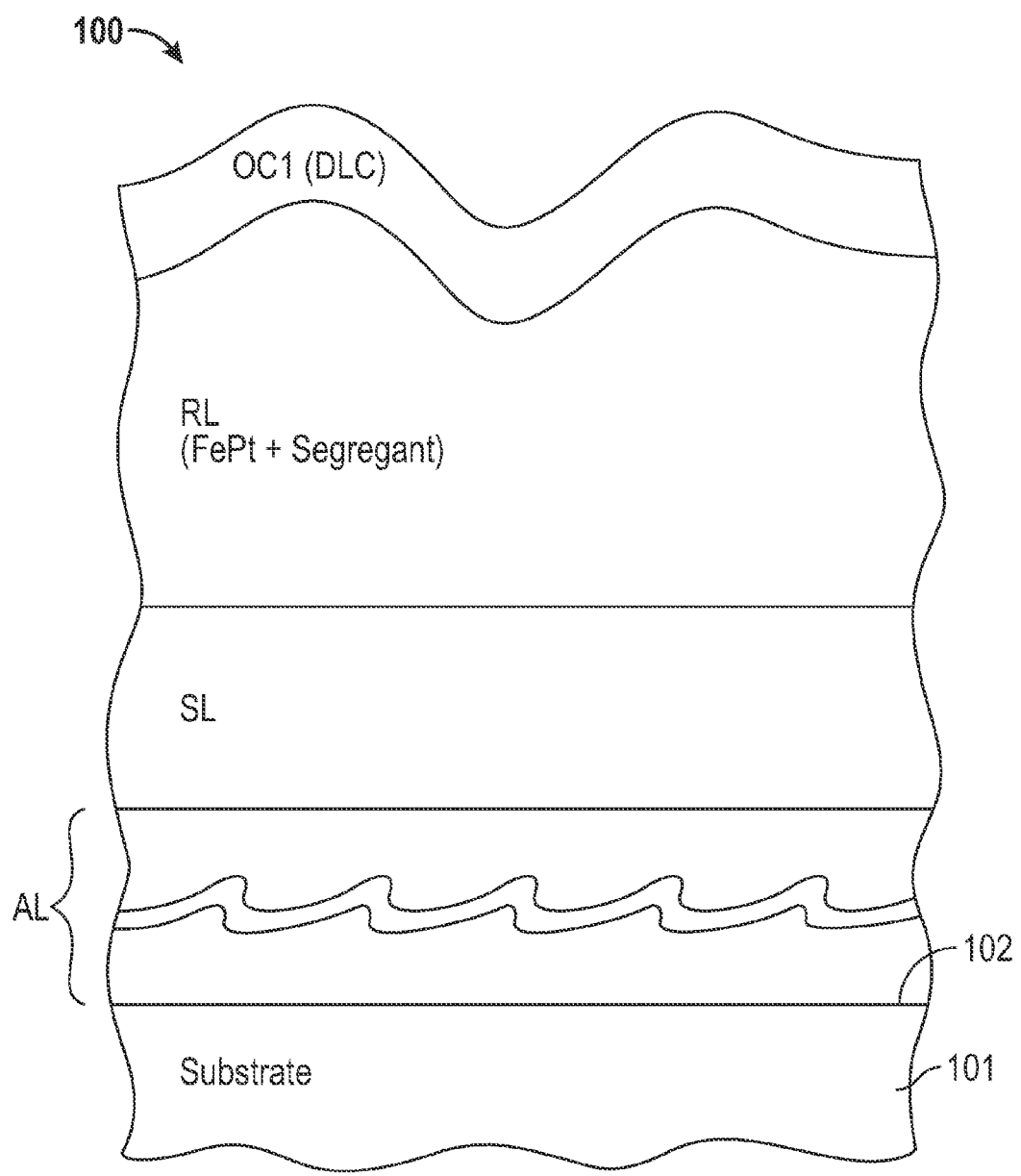
FIG. 1 is a sectional view showing the TAR disk with a FePt recording layer (RL) and first protective overcoat (OC1) before the vacuum planarization method of this invention.

FIG. 1 is a sectional view showing the TAR disk 100 with a recording layer (RL) of a FePt alloy with segregant before the vacuum planarization method of this invention. The disk 100 is a substrate 101 having a generally planar surface 102 on which the representative layers are sequentially deposited, typically by sputtering. The disk 100 is depicted as a perpendicular magnetic recording disk with a recording layer (RL) having perpendicular (i.e., generally perpendicular to substrate surface 101) magnetic anisotropy.

The hard disk substrate 101 may be any commercially available glass substrate, but may also be a conventional aluminum alloy with a NiP surface coating, or an alternative substrate, such as silicon, canasite or silicon-carbide. An adhesion layer (AL), such as a layer of NiTa, Cr, Cu or Zr, is deposited to a thickness of between about 20-150 nm on substrate surface 102. A seed layer (SL), such as a layer of MgO, TiN or TiC, is deposited on the AL to a thickness between about 2-20 nm to define a texture for the subsequently deposited FePt RL.

The perpendicular media that forms the RL is a high-$H_k$ substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magneto-crystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$–X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While the method will be described for media with a FePt RL, the method is also fully applicable to media with a CoPt (or a pseudo-binary CoPt-X alloy based on the CoPt $L1_0$ phase) RL. The RL also typically includes a segregant, such as one or more of $SiO_2$, C, B, BN and SiNx that forms between the FePt grains and reduces the grain size.

The FePt RL is sputter deposited onto the SL to a thickness of between about 4 to 15 nm while the disk substrate 101 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets. As an alternative method for forming the FePt RL, sequential alternating layers of Fe and Pt can be deposited by sputter depositing from separate Fe and Pt targets, using a shutter to alternately cover the Fe and Pt targets, with each Fe and Pt layer having a thickness in the range of about 0.15 nm to 0.25 nm to the desired total thickness.

A first protective overcoat (OC1) is deposited on the RL, preferably to a thickness between about 1-5 nm. OC1 is a layer of amorphous carbon, like amorphous diamond-like carbon (DLC). The amorphous carbon or DLC may also be hydrogenated and/or nitrogenated, as is well-known in the art. On the completed disk, a liquid lubricant, like a perfluorpolyether (PFPE), is coated on the OC1.

However, the high-temperature deposition of the FePt causes nanoclustering and agglomeration of the FePt material at the surface of the FePt RL. This is because the high surface energy of the Fe and Pt causes the grains to be more spherically shaped, and the segregant causes the grains to grow vertically. This results in undesirable high surface roughness of the RL, which is replicated in the surface of the OC1. The upper surface of the OC1 should have maximum peaks (Rp) less than about 3 nm and a root-mean-square (RMS) peak-to-peak surface roughness (Rq) of less than 0.5 nm for proper flyability of the air-bearing slider that supports the read/write head and the NFT. However, Rp is typically greater than 6 nm and Rq is typically greater than 1 nm. High surface roughness adversely affects the flyability of the TAR disk drive's air-bearing slider that supports the read/write head and the NFT. The slider may be required to be maintained at too high of a fly-height, which can reduce the ability to heat the RL and to read and write data to the RL, thus reducing the areal data density of the RL. High surface roughness can also cause excessive lubricant pick-up by the air-bearing surface (ABS) of the slider, which can increase the slider's fly-height.

Figure 2A:
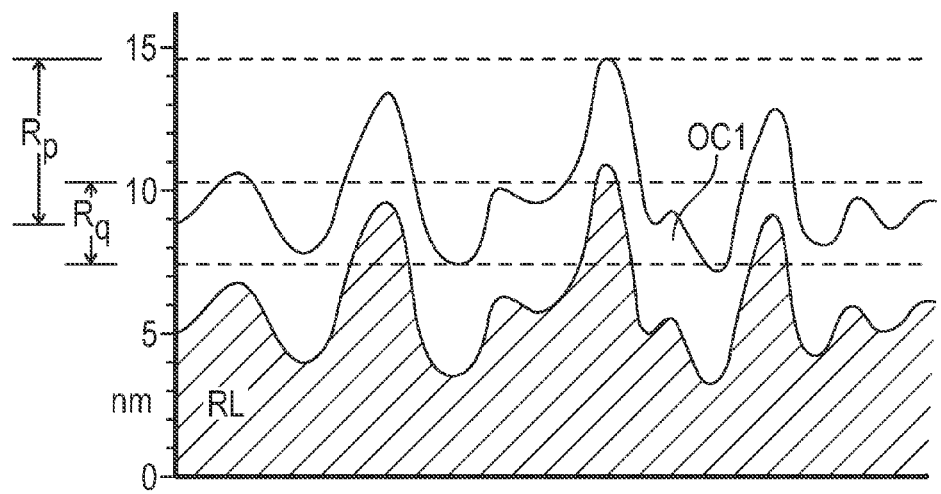
FIGS. 2A-2E are sectional views of the recording layer (RL) and amorphous carbon overcoats of the TAR disk at various steps of the vacuum planarization method of the invention.
Figure 2B:
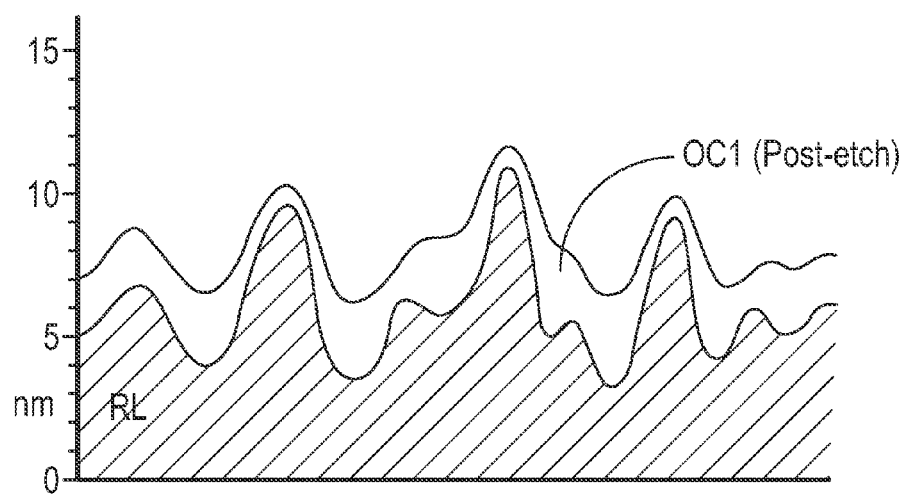
Figure 2C:
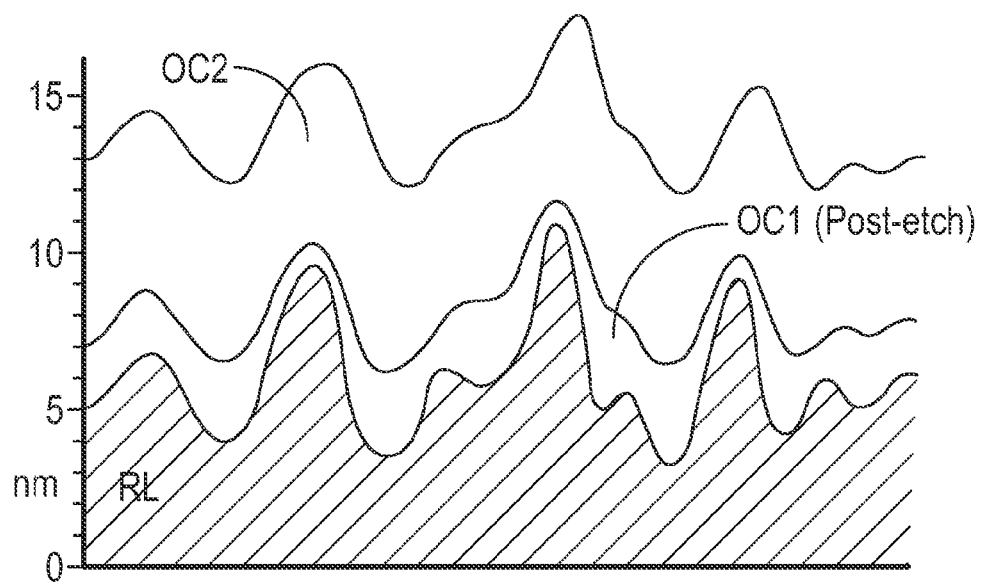
Figure 2D:
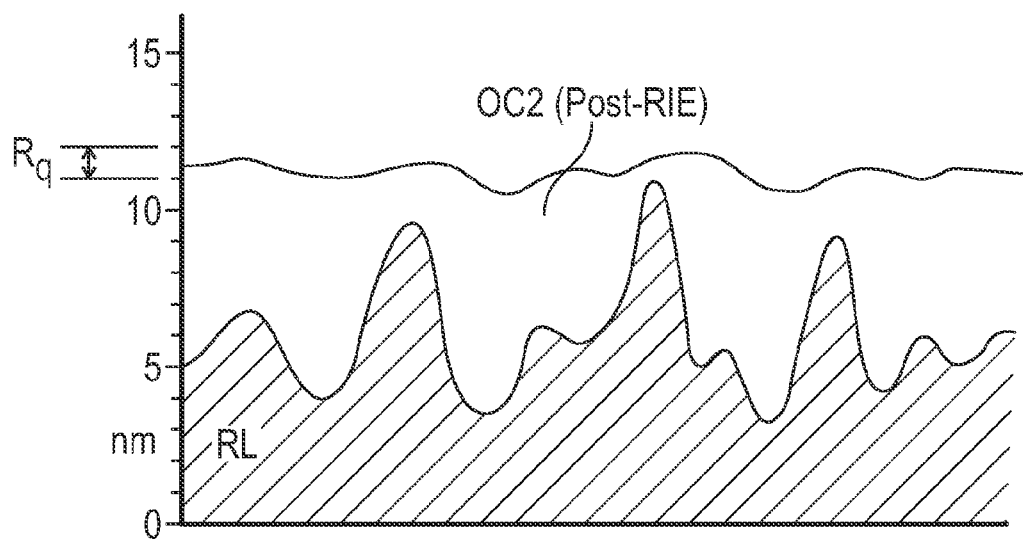
Figure 2E:
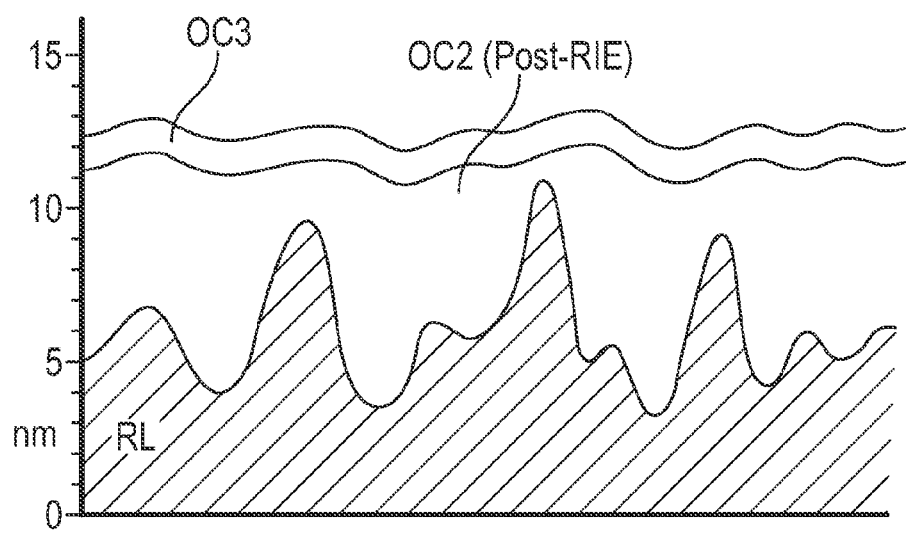

This invention is a vacuum planarization process that results in a TAR disk with a protective overcoat having a Rp less than 3 nm and a Rq less than 1 nm, preferably less than 0.5 nm. FIGS. 2A-2E illustrate the method of the invention. The vertical axes in FIGS. 2A-2E illustrate the surface roughness with the horizontal axes not being to scale so that the variation in the surface roughness can be better illustrated. FIG. 2A is a sectional view of a FePt alloy RL with a segregant, like $SiO_2$, with a DLC overcoat (OC1) prior to the vacuum planarization process. The RL has a high surface roughness due to the high-temperature deposition of the FePt with the segregant that causes nanoclustering and agglomeration of the FePt material at the surface of the RL. This is because the high surface energy of the Fe and Pt causes the grains to be more spherically shaped, and the segregant causes the grains to grow vertically. The RL has a thickness of about 5 nm and the OC1 has a thickness of about 3 nm with a maximum peak (Rp) of about 6 nm and a Rq of about 1 nm. In FIG. 2B the structure of FIG. 2A has been subjected to an inductively-coupled plasma (ICP) non-reactive etching with Ar. The etching was done at 500 W power with a 50V bias voltage for 2.0 seconds. This etching step removes at least half the thickness of OC1 and substantially reduces the maximum peaks. Next in FIG. 2C a second DLC overcoat (OC2) is sputter deposited onto the etched surface of OC1. The thickness of OC2 is preferably between about 5-7 nm. OC2 has a surface topology that generally replicates the surface topology of the previously etched surface of OC1. Next, in FIG. 2D the structure of FIG. 2C has been subjected to an inductively-coupled plasma (ICP) reactive-ion-etching (RIE) with $H_2$ and Ar. The etching was done at 500 W power with a 50V bias voltage for 5 to 10 seconds. This etching step removes at least half the thickness of OC2 and substantially reduces the maximum peaks Rp and reduces Rq, which is now less than 1.0 nm, more typically less than 0.5 nm. FIG. 2E depicts the structure after deposition of an optional third overcoat (OC3). OC3 may be a thin, for example about 1 nm, nitrogenated DLC overcoat. The upper nitrogenated DLC OC3 prepares the protective overcoat for subsequent deposition of the conventional liquid lubricant, typically a perfluorinated polyether (PFPE). Alternatively, OC3 may be a single layer or multilayer of substantially different material(s) than OC2, for example oxides or nitrides of Si, Zr, and Ti.

The method of the invention was performed for various thicknesses of the refill overcoat (OC2) and it was determined that OC2 has to have a thickness of at least 5 nm for substantial improvement in Rp and Rq. For example, in one set of experiments, if OC2 is only 3 nm, there is no reduction in Rp and Rq, but if OC2 is at least 6 nm, then Rp is reduced from 6 to 3.5 nm and Rq is reduced from 1.0 to 0.5 nm. The method of the invention was also performed for various ratios of $H_2$/Ar for the ICP-RIE etch and it was determined that $H_2$/Ar has to be greater than 7/100 for substantial improvement in Rp and Rq. For example, in one set of experiments, if there is no RIE, i.e., only an Ar plasma, there is no reduction in Rp and Rq, but if $H_2$/Ar is at least 7/100, then Rp is reduced from 6 to 3 nm and Rq is reduced from 3.0 to 0.3 nm. Increases in $H_2$/Ar up to 30/100 provide relatively minimal additional reduction in Rp and essentially no additional reduction in Rq. The measurements of Rp and Rq for these experiments were performed using atomic force microscopy (AFM).

Figure 3A:
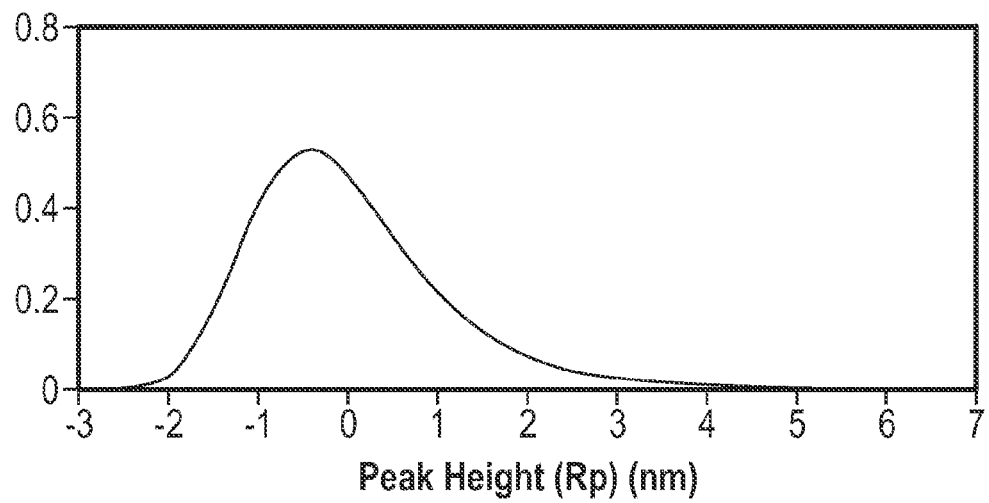
FIG. 3A is a normal distribution of surface peaks Rp for a disk with a 3 nm DLC overcoat before the vacuum planarization method of the invention.
Figure 3B:
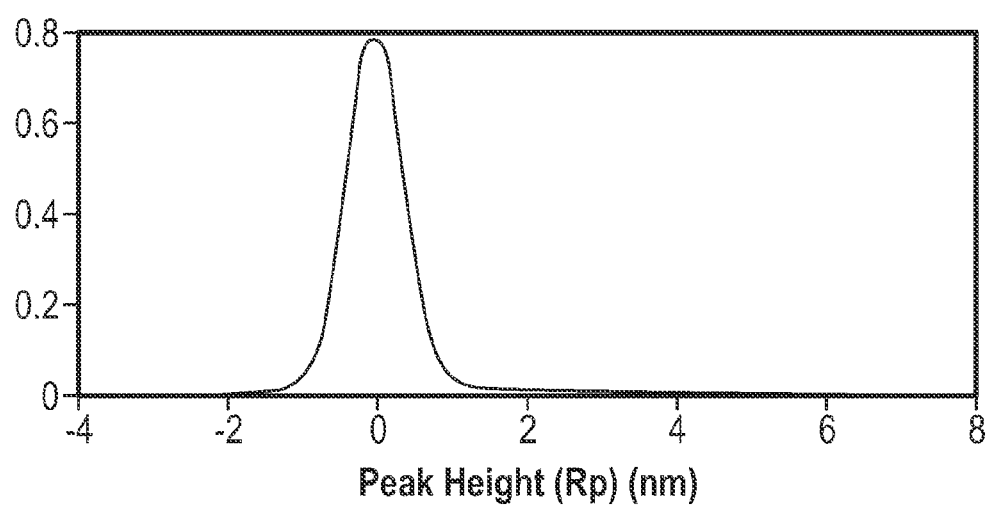
FIG. 3B is a normal distribution of surface peaks Rp for the same disk as in FIG. 3A but after the vacuum planarization method of the invention.

FIG. 3A is a normal distribution of surface peaks Rp for a disk with a 3 nm DLC overcoat before the vacuum planarization method of the invention, i.e., a disk with a structure like in FIG. 2A. The distribution is wide, with 4 sigma Rp at over 4 nm. FIG. 3B is a normal distribution of surface peaks Rp for the same disk after the vacuum planarization method of the invention, i.e., a disk with a structure like in FIG. 2D. The first ICP plasma etch removed substantially all of OC1, then OC2 was deposited to a thickness of 6 nm and the second ICP-RIE removed 3 nm of OC2, leaving a DLC thickness of about 3 nm. The distribution has narrowed significantly, with 4 sigma Rp around 2 nm.

Thus the vacuum planarization method of the invention substantially reduces surface roughness of a TAR disk with a substantially chemically-ordered FePt of FePt-X alloy RL. This enables the slider to be maintained at a lower fly-height, thus enabling higher areal data density to be achieved. The smooth surface also avoids excessive lubricant pick-up by the slider's ABS, which would reduce the fly-height.

To determine if the vacuum planarization adversely affected the chemical ordering of the FePt RL due to possible ion implantation, X-ray diffraction measurements were performed on the media structure as deposited and after vacuum planarization. The ratio of intensities for the superlattice FePt (001) and fundamental FePt(002) peaks decreased very slightly, indicating that good chemical ordering, and thus strong magnetic anisotropy, is present in the FePt RL after vacuum planarization. It was found that the refilling of the amorphous carbon, i.e., the deposition of OC2, to a thickness of at least 5 nm is sufficient to protect the FePt RL from damage during the ICP-RIE.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a perpendicular magnetic recording disk comprising:
    providing a substrate having a perpendicular magnetic recording layer thereon and a first essentially amorphous carbon overcoat on the recording layer, the recording layer comprising a substantially chemically-ordered alloy of Pt and an element selected from Fe and Co;
    etching the first overcoat with a non-chemically reactive plasma to remove at least one-half the thickness of the first overcoat, leaving a reduced-thickness first overcoat having an etched surface;
    depositing on the etched surface of the reduced-thickness first overcoat a second essentially amorphous carbon overcoat; and
    etching the second overcoat with a chemically reactive plasma to remove at least one-half the thickness of the second overcoat, leaving a reduced-thickness second overcoat having an etched surface.

2. The method of claim 1 wherein the recording layer includes a segregant.

3. The method of claim 2 wherein the segregant is selected from $SiO_2$, C, B, BN and $SiN_x$.

4. The method of claim 1 wherein the first and second overcoats consist essentially of diamond-like carbon.

5. The method of claim 1 wherein etching the first overcoat with a non-chemically reactive plasma comprises etching with an argon (Ar) plasma.

6. The method of claim 1 wherein etching the second overcoat with a chemically reactive plasma comprises etching with a plasma of Ar and hydrogen ($H_2$).

7. The method of claim 6 wherein the ratio of $H_2$ to Ar is greater than 7/100.

8. The method of claim 1 wherein the recording layer comprises a substantially chemically-ordered pseudo-binary FePtX alloy in the $L1_0$ phase, where X is one or more of Ni, Au, Cu, Pd, Mn and Ag.

9. The method of claim 1 wherein the recording layer comprises a substantially chemically-ordered pseudo-binary CoPtX alloy in the $L1_0$ phase, where X is one or more of Ni, Au, Cu, Pd, Mn and Ag.

10. The method of claim 1 wherein the root-mean-square peak-to-peak surface roughness (Rq) of the first overcoat is greater than 1.0 nm and the Rq of the etched second overcoat is less than 0.5 nm.

11. The method of claim 1 further comprising, after etching the second overcoat, depositing a third overcoat on the etched surface of the second overcoat.

12. The method of claim 11 wherein the third overcoat consists essentially of nitrogenated diamond-like carbon.

13. A method for planarizing a perpendicular magnetic recording disk, the disk having a perpendicular magnetic recording layer comprising a substantially chemically-ordered alloy of Pt and an element selected from Fe and Co and a segregant selected from $SiO_2$, C, B, BN and $SiN_x$, and a first essentially amorphous carbon overcoat on the recording layer, the planarizing method comprising:
    etching the first overcoat with a non-chemically reactive plasma to remove at least one-half the thickness of the first overcoat, leaving a reduced-thickness first overcoat having an etched surface;
    depositing on the etched surface of the reduced-thickness first overcoat a second essentially amorphous carbon overcoat to a thickness of at least 5 nm; and
    reactive-ion-etching the second overcoat with a $H_2$/Ar plasma wherein the $H_2$/Ar ration is equal to or greater than 7/100 to remove at least one-half the thickness of the second overcoat, leaving a reduced-thickness second overcoat having an etched surface.

14. The method of claim 13 wherein etching the first overcoat with a non-chemically reactive plasma comprises etching with an argon (Ar) plasma.

15. The method of claim 13 wherein the recording layer comprises a substantially chemically-ordered pseudo-binary FePtX alloy in the $L1_0$ phase, where X is one or more of Ni, Au, Cu, Pd, Mn and Ag.

16. The method of claim 13 wherein the recording layer comprises a substantially chemically-ordered pseudo-binary CoPtX alloy in the $L1_0$ phase, where X is one or more of Ni, Au, Cu, Pd, Mn and Ag.

17. The method of claim 13 wherein the root-mean-square peak-to-peak surface roughness (Rq) of the first overcoat is greater than 1.0 nm and the Rq of the etched second overcoat is less than 0.5 nm.

18. The method of claim 13 further comprising, after etching the second overcoat, depositing a third overcoat on the etched surface of the second overcoat.

19. The method of claim 18 wherein the third overcoat consists essentially of nitrogenated diamond-like carbon.

* * * * *